Dec. 13, 1966 G. J. PRAGER 3,290,861
ROLL WRAPPER
Filed Sept. 5, 1963 11 Sheets-Sheet 4
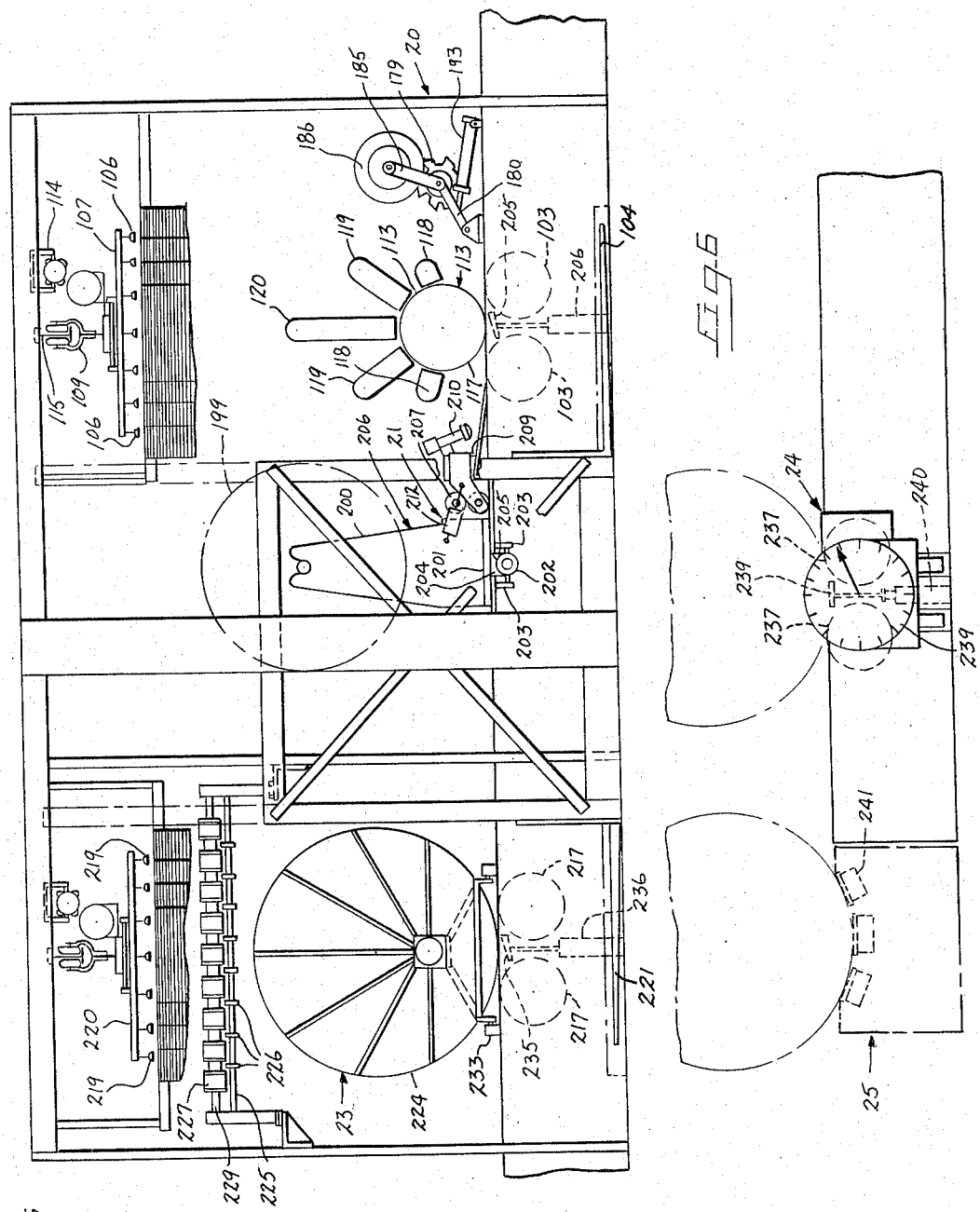
INVENTOR.
George J. Prager
BY Dec. 13, 1966  G. J. PRAGER  3,290,861
ROLL WRAPPER
Filed Sept. 5, 1963  11 Sheets-Sheet 5
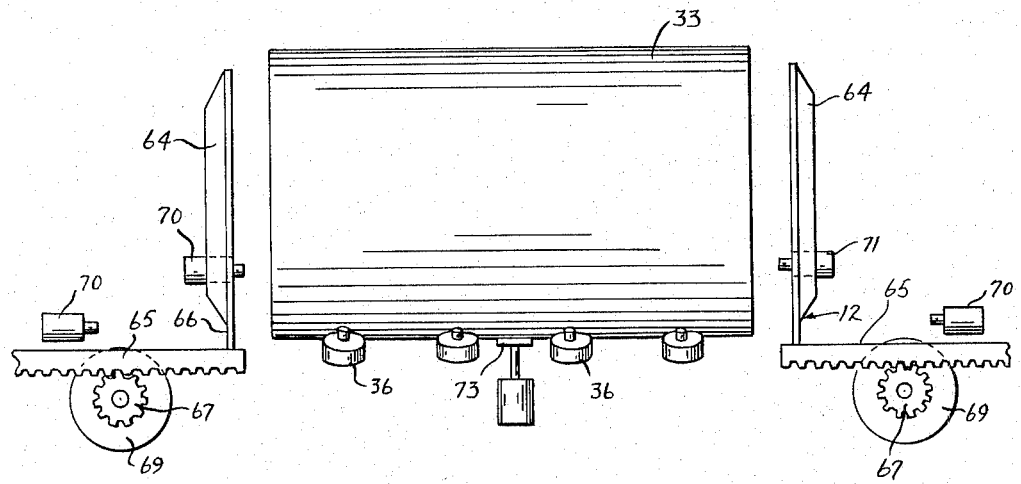
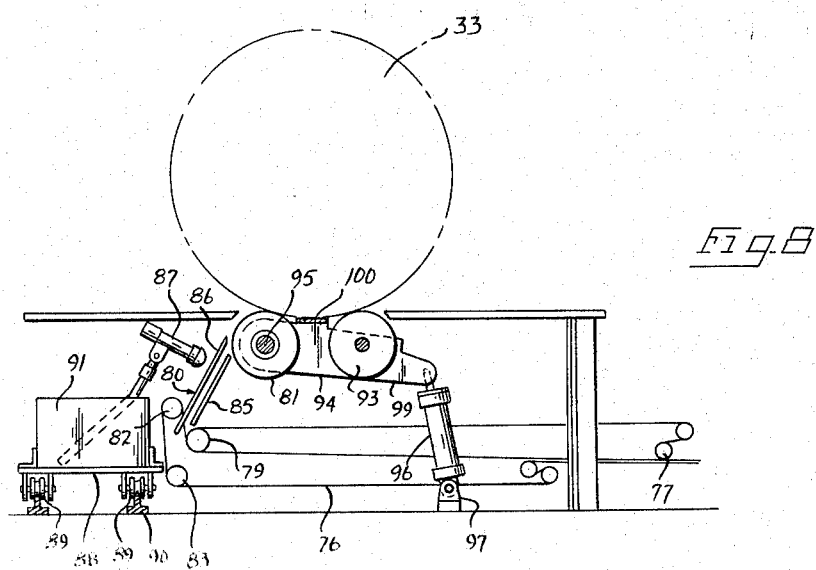
INVENTOR.
George J. Prager
BY
ATTORNEYS

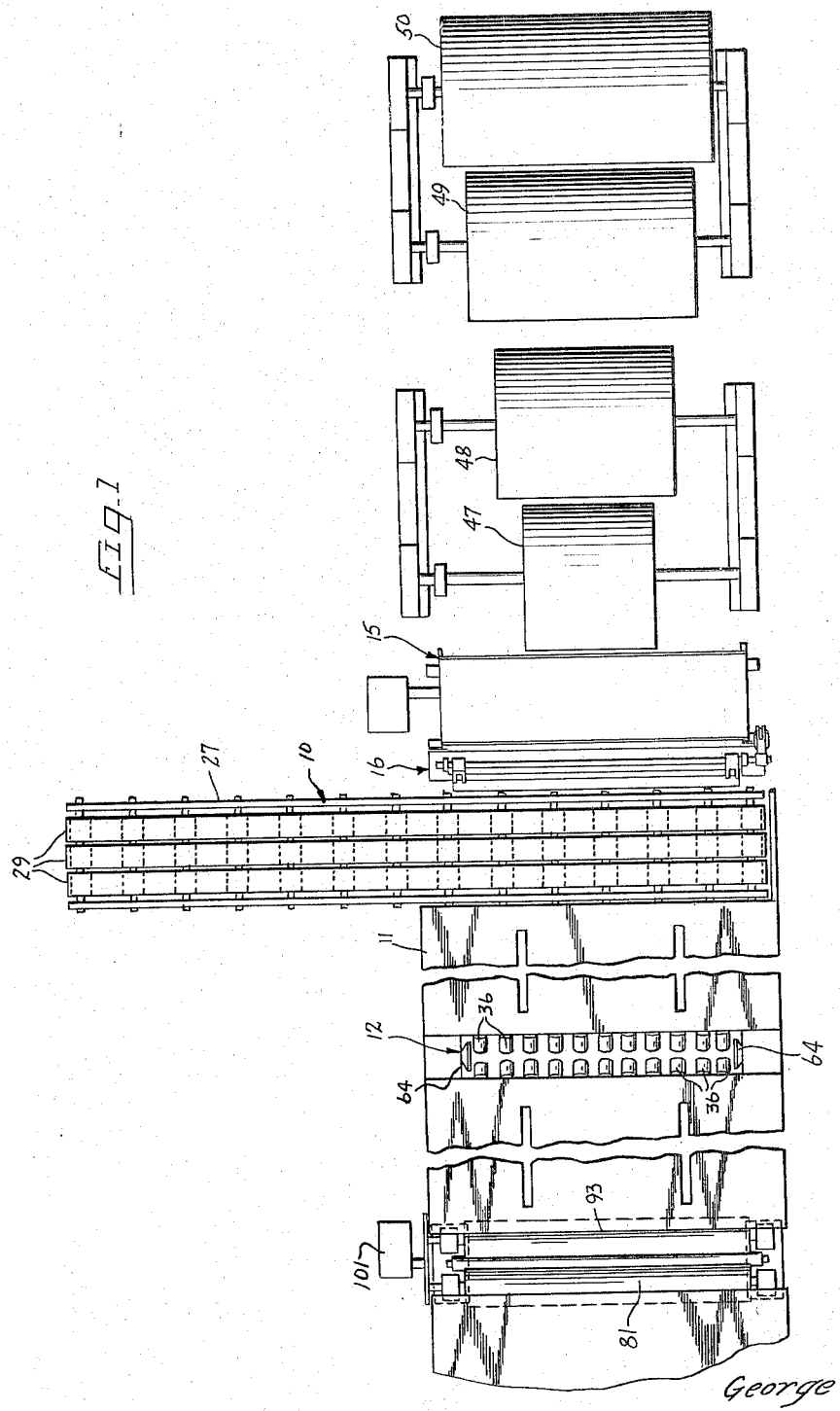

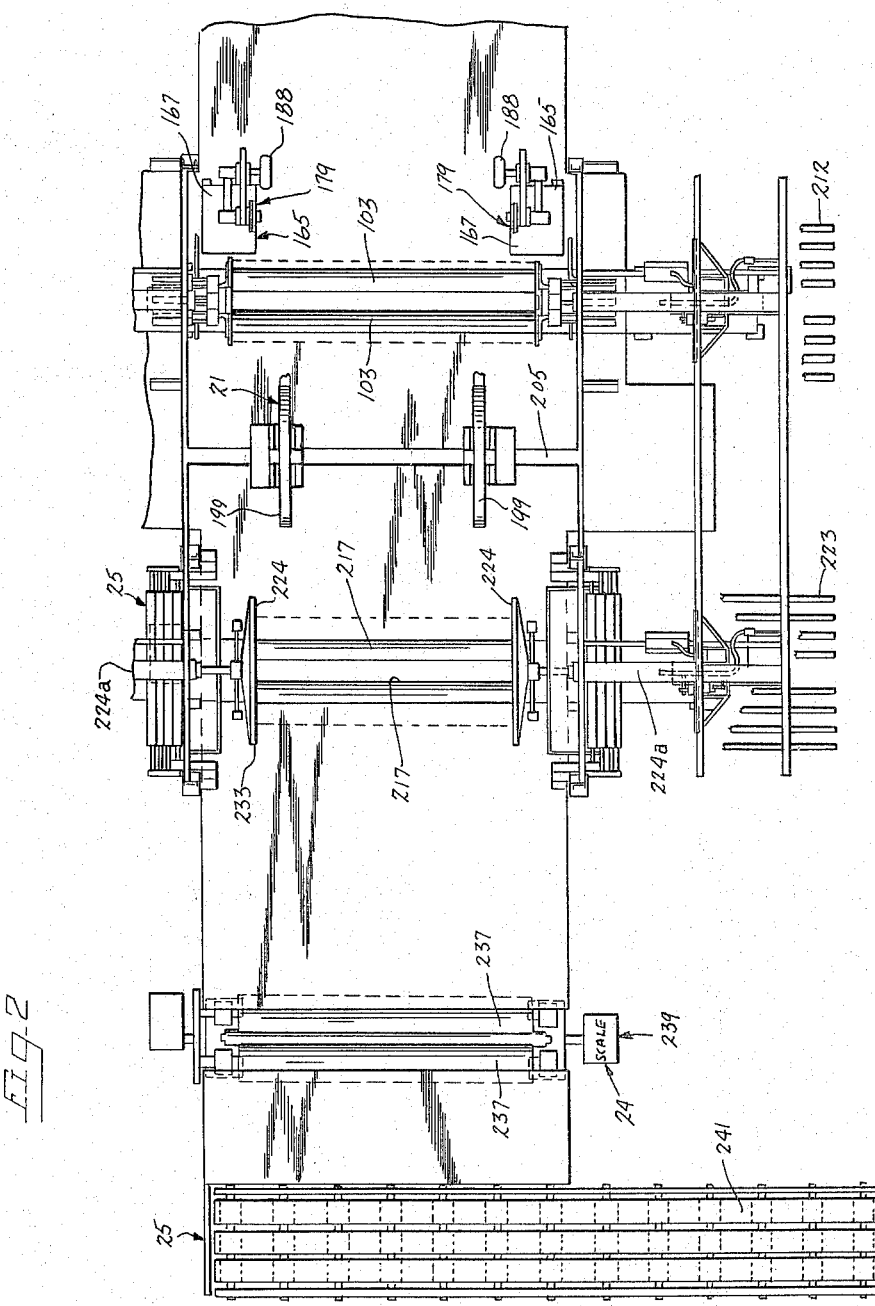

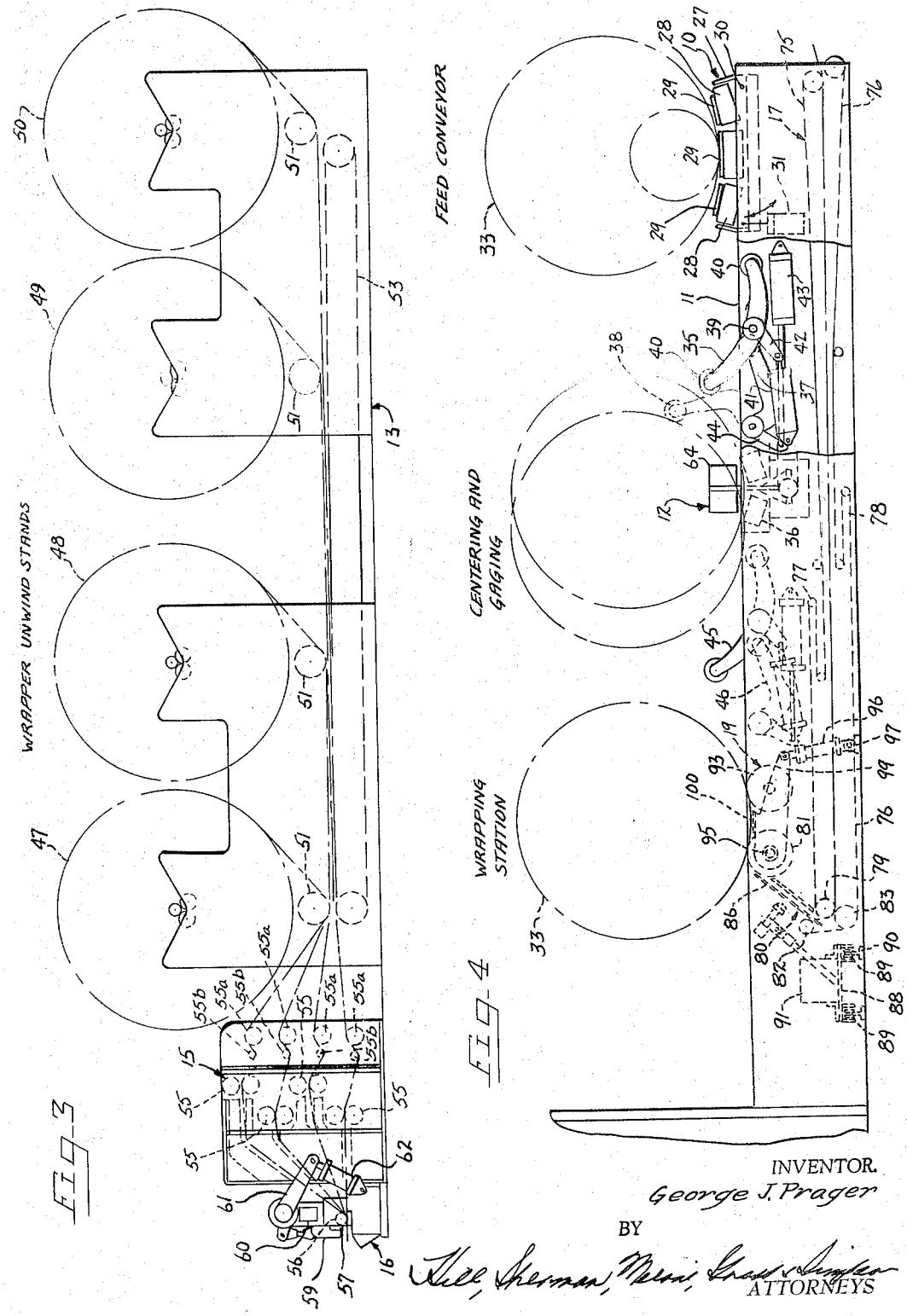

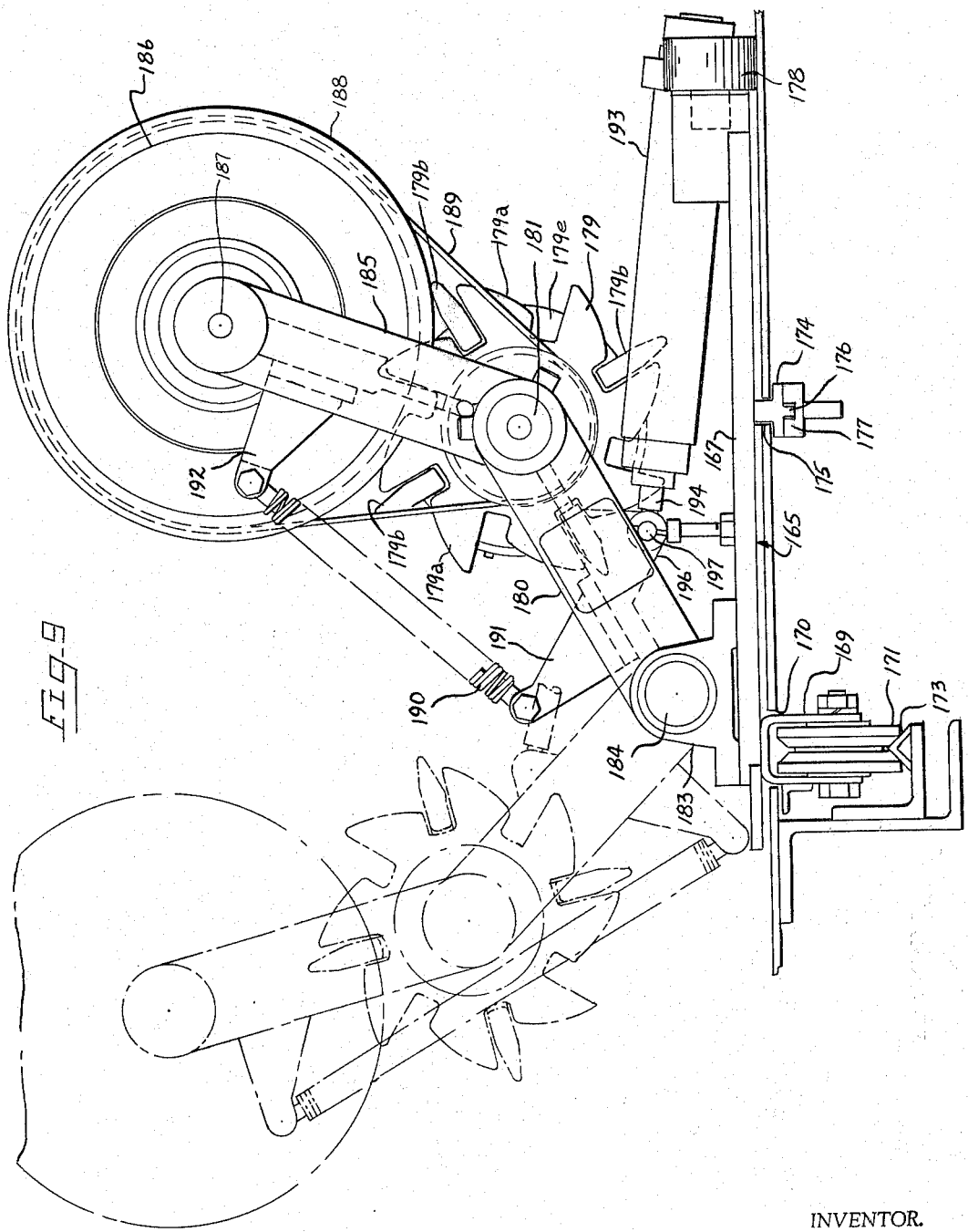

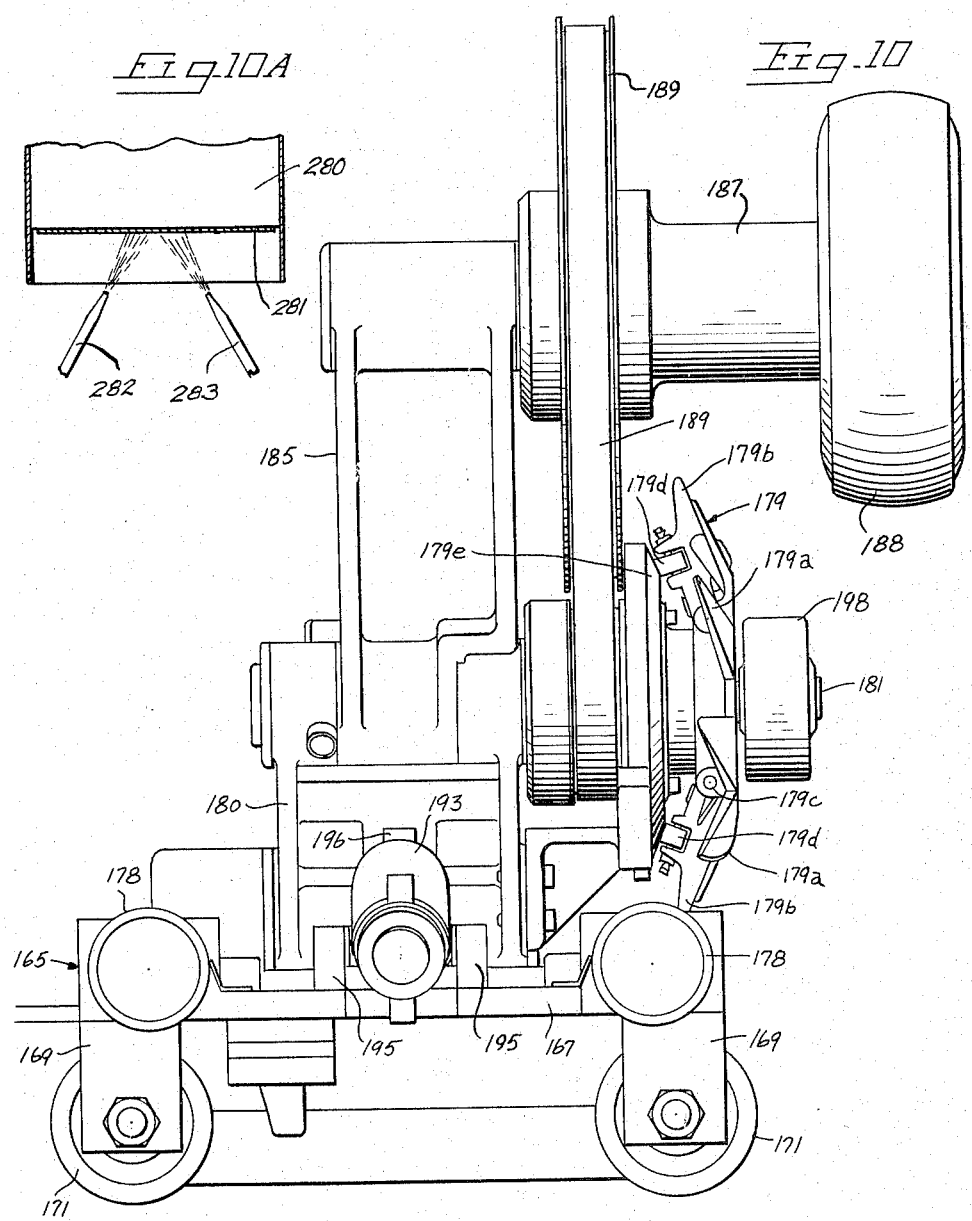

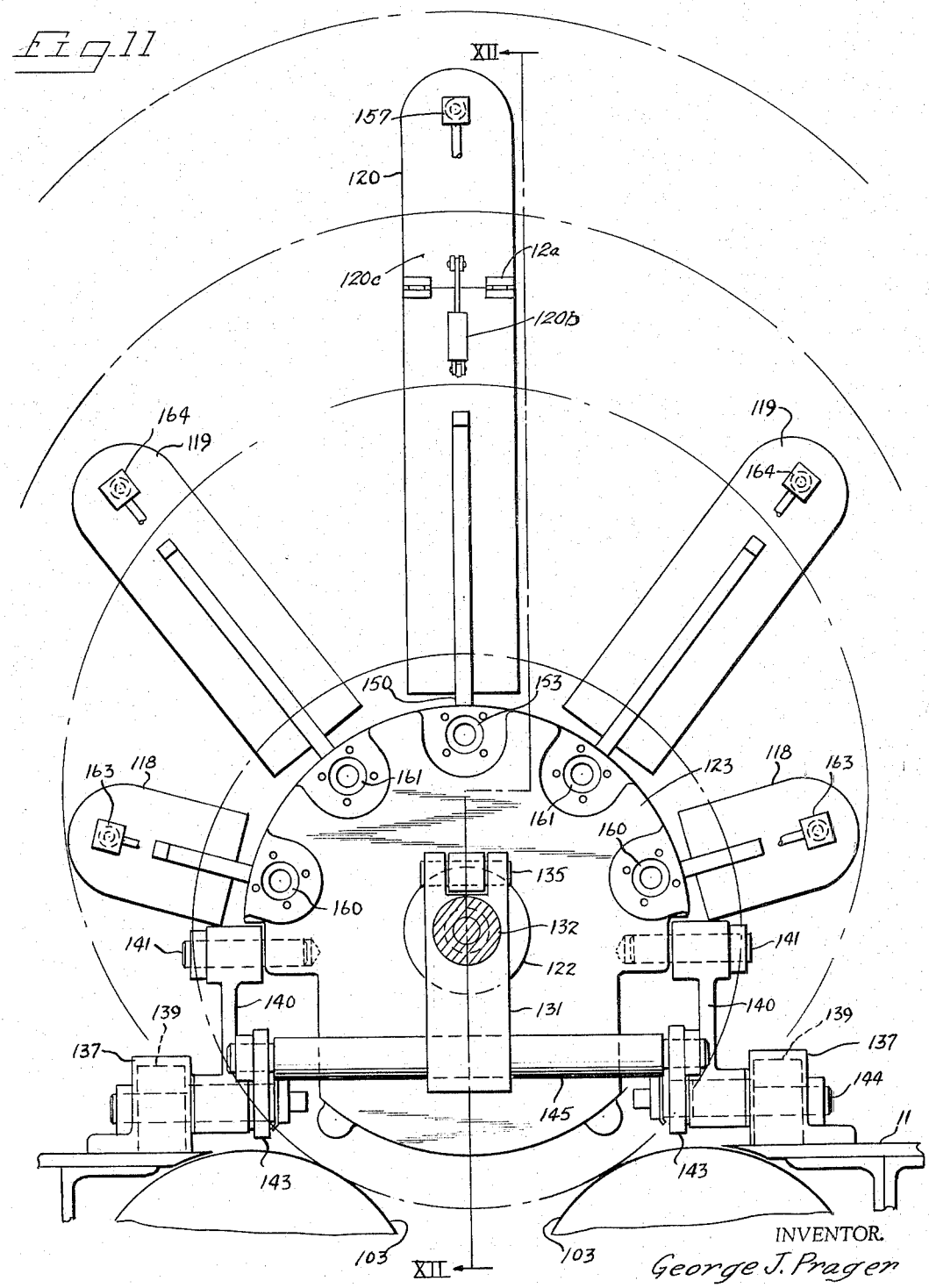

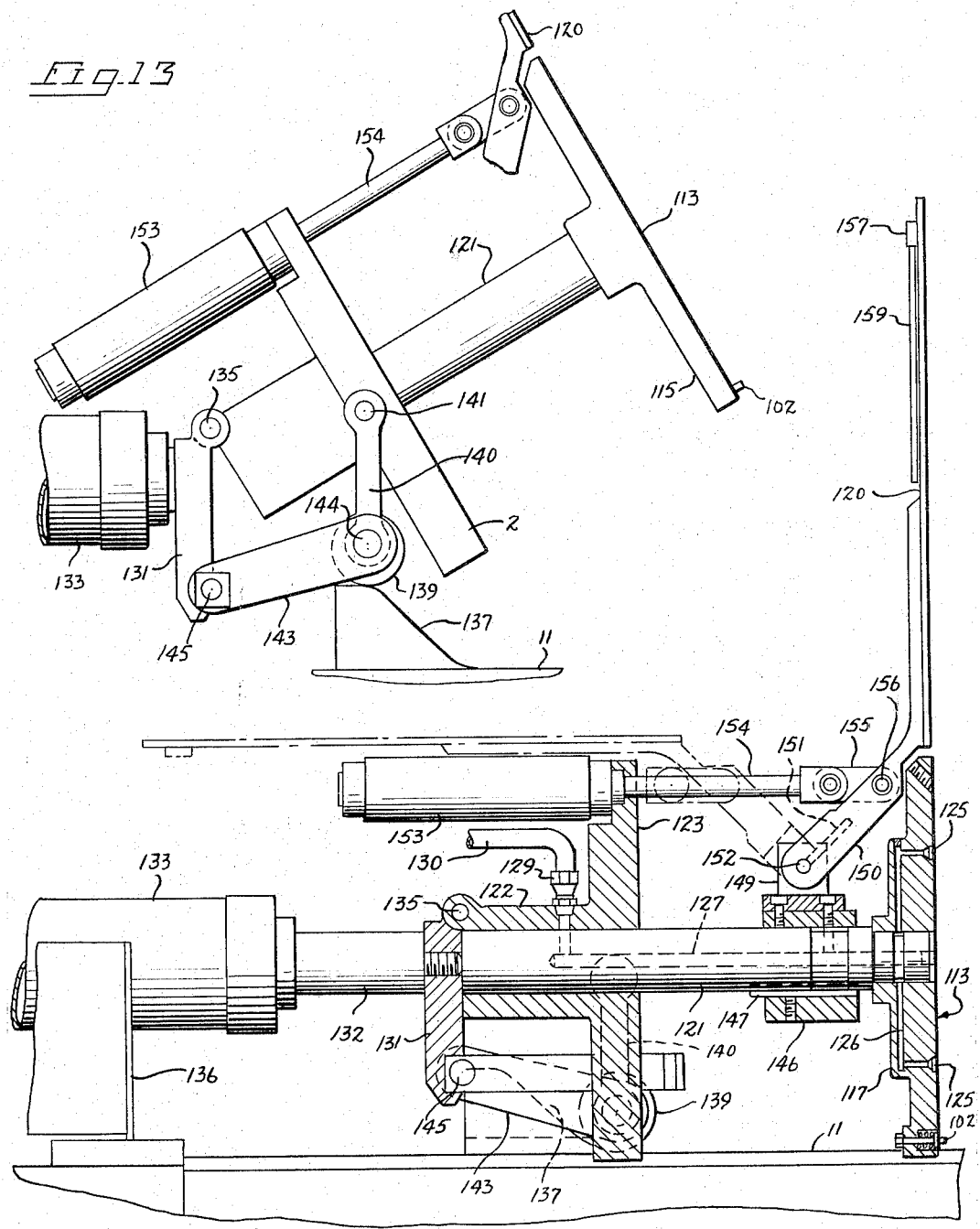

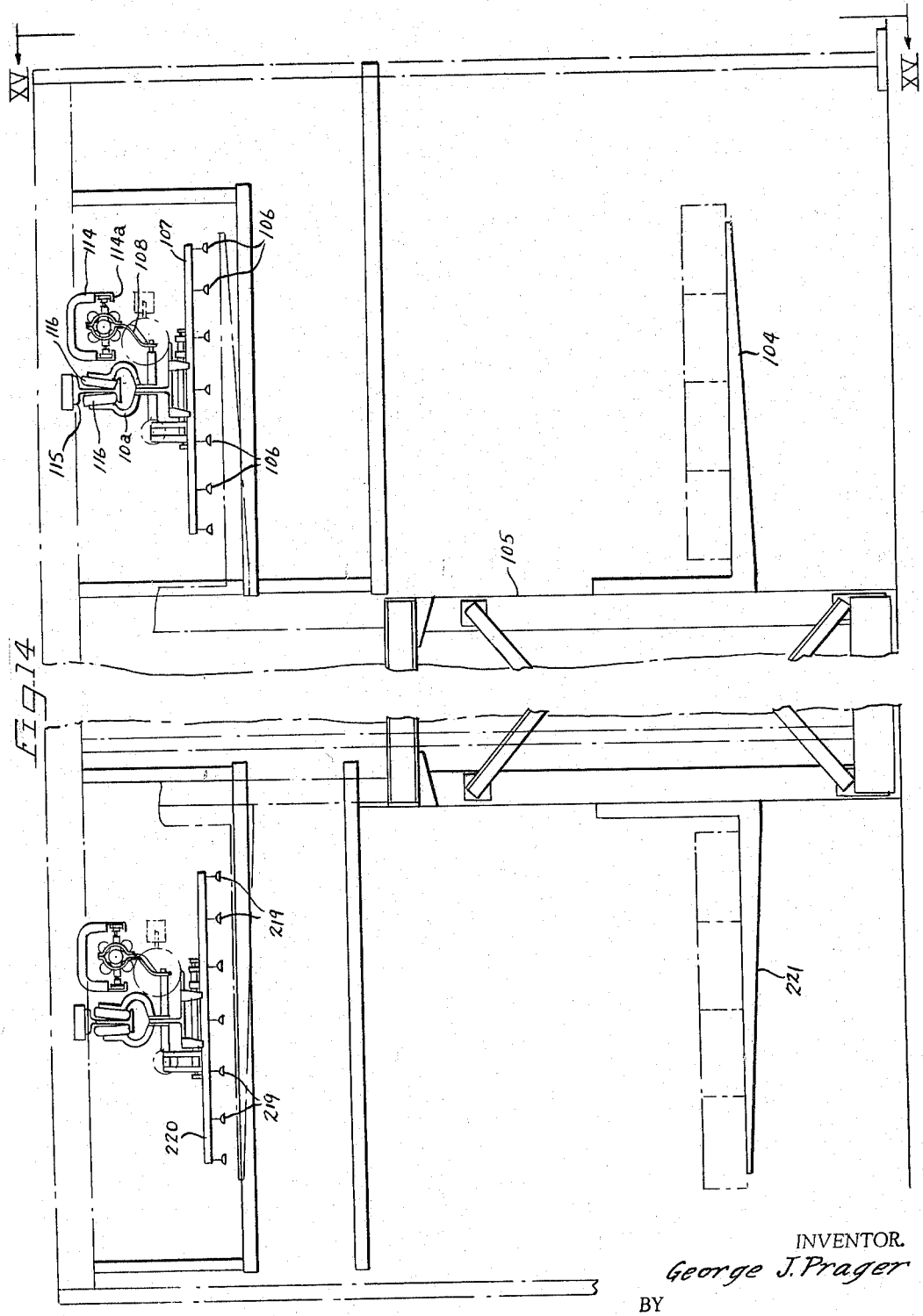

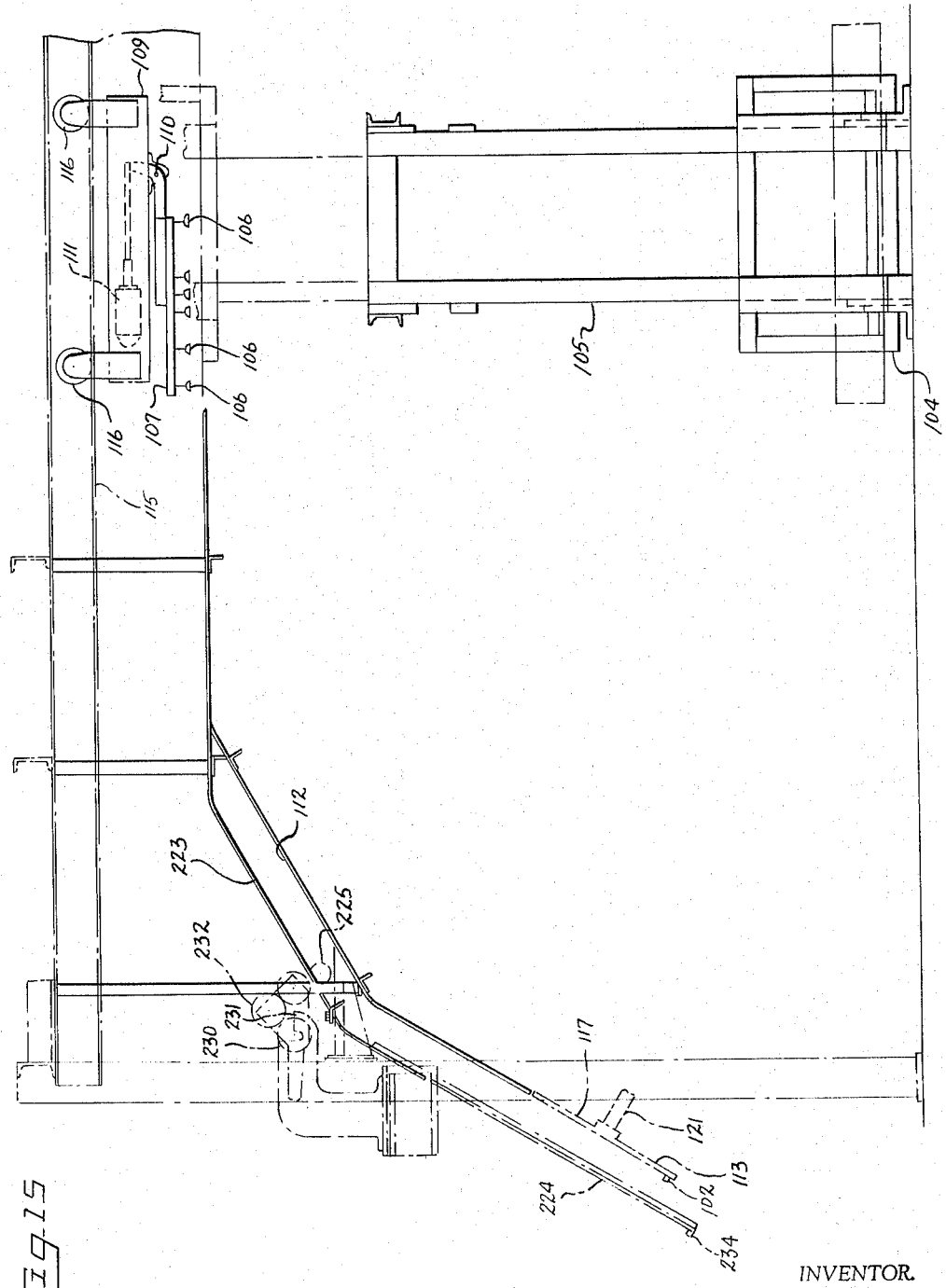

United States Patent Office 3,290,861
Patented Dec. 13, 1966

3,290,861
ROLL WRAPPER
George J. Prager, Bryn Mawr, Pa., assignor to Beloit Eastern Corporation, Downington, Pa., a corporation of Delaware
Filed Sept. 5, 1963, Ser. No. 306,804
22 Claims. (Cl. 53—214)

This invention relates to improvements in apparatus for wrapping rolls of paper and the like.

More particularly the present invention relates to a mechanism well suited for use in a paper mill wherein the paper is formed in large rolls which are wrapped for handling and shipping. In the mill, different paper lines may be producing runs of different paper producing an output of paper rolls of different sizes and other characteristics. The rolls have heretofore been wrapped either by hand or with mechanical aids, or if wrapped on machines substantial manual attention has been required and it has been difficult to retain the identity of the individual rolls through the machine. Not only must the identity of the roll be retained so as to know the type of paper in the roll after it is wrapped, other variables must be taken care of to assure proper wrapping and the diameters of the rolls vary, the lengths vary and the number of layers or types of wrapping required will vary.

The present invention provides a paper roll wrapping machine wherein a roll of any characteristic, size and weight can be received at the head end and automatically transferred through the wrapping machine and be properly wrapped with a wrapper with the right length, the right width, the right type and with the correct number of wrappers and headers being applied, and the identity of the roll retained throughout its travel through the machine so that rolls delivered to the machine can be intermixed without losing their identity at the delivery end of the machine. The present invention further provides an automatic roll wrapping machine which automatically performs a number of operations for wrapping a roll including receiving, transferring, and measuring the roll in diameter and length and applying a predetermined number of wrappers to the roll and weighing, marking and discharging the roll with each of the functions being adapted for automatic control and the rolls progressing through the machine automatically with the operation which consumes the longest time controlling the other operation so that rolls can be sequentially fed through the machine at an optimum speed and with optimum operating efficiency.

A principal object of the invention is to provide a novel and improved form of appartus for wrapping rolls of paper or like material under automatic, semi-automatic, or manual control.

A further object of the invention is to provide an improved wrapping apparatus and control therefor, for wrapping intermixed rolls of paper or like material of various roll diameters and widths.

A further object of the invention is to provide a roll wrapping arrangement that will fully wrap, crimp, head inside and out, and edge or center band a roll of paper or like material in either a semi or fully automatic operation.

A further object of the invention is to provide a low profile floor mounted roll wrapping arrangement to eliminate the necessity for having pits in the floor or cumbersome overhead structure that is required in existing roll wrapping equipment.

Still another object of the invention is to provide an improved apparatus for wrapping rolls of paper, arranged with a view towards ready adaptability for operation by placing IBM cards in a recording instrument (or using similar memory equipment) instigating a wrapping operation.

A still further object is to provide a mechanism for use with an automatic device for coding, memorizing and identifying the contents of the wrapped rolls.

A further object of the invention is to provide an apparatus for wrapping rolls of paper in which rolls are fed, centered and gauged for width and diameter at the inby end of the machine. Centering the roll for wrapping and gauging the width and diameter of the roll, is done to determine the width and length of the wrapper required for wrapping the roll under automatic or manual control.

A further object of the invention is to provide an ap-

A further object of the invention is to provide apparatus that will, by automatic or manual control, select a desired width of wrapper material, determine and feed the required length, feed the material past a knife cut the desired length, convey the cut wrapper past a glue station, where the leading and trailing edges have glue automatically applied, feed to a wrapping station where a pair of rotating rollers provide a roll support nip pressure and attach the glued wrapper to the rotating roll of paper or like material.

A further object of the invention is to provide a roll wrapping arrangement of variable components that will provide a high production rate wrapping rolls of variable widths and diameters intermixed automatically or semi-automatically by means unique to the art.

Still another object of the invention is to provide a wrapping apparatus for rolls of paper in which wrapping of the rolls is attained by supporting the roll on rotating rollers and supplying a glued wrapper to the nip between the roll and one of the rollers to adhere thereto and to be wrapped there about by rotatable movement of the roll and pressure between the roll and its rollers.

A further object of the invention is to provide a roll wrapping apparatus having a means for advancing the rolls to various wrapping stations.

Still another object of the invention is to provide a roll wrapping apparatus having an improved form of heading apparatus for applying heads on the ends of the rolls, in which the required size of head may be automatically selected an applied to the header under automatic or manual control.

A still further object of the invention is to provide an improved form of head feeder for applying inside heads to the ends of wrapped rolls of paper in which the header is adapted for heading rolls of various diameters in centered relation with respect to the head of the roll during each heading operation.

Another object of the invention is to provide an automatic roll wrapping machine wherein the machine in effect sets the production rate rather than the operator, i.e. the minimum time cycle is limited by the longest cycle required by the section of the machine, and any manual operations must be completed within the cycle of the machine.

These and other objects of the invention will appear from time to time as the following specification proceeds and with reference to the accompanying drawings wherein:

FIGURE 1 is a diagrammatic plan view of a section of a roll wrapper constructed in accordance with the principles of the present invention;

FIGURE 2 is a forward continuation of FIGURE 1;

FIGURE 3 is a diagramatic view in side elevation of a portion of a wrapper shown in FIGURES 1 and 2 and showing the wrapper unwinding stands and the shear for shearing the wrapper to length;

FIGURE 4 is a forward continuation of FIGURE 3, diagrammatically showing the feed conveyor, the centering and gauging station and the wrapping station;

FIGURE 5 is a forward continuation of FIGURE 3 diagrammatically showing the inside heading and crimping station, the banding station and the outside heading station;

FIGURE 6 is a forward continuation of FIGURE 5 diagrammatically showing the crimping and weighing station and the conveyor carrying the roll away for shipment or storage;

FIGURE 7 is a diagrammatic transverse sectional view illustrating certain principles of the centering station not shown in FIGURES 1 and 4;

FIGURE 8 is an enlarged diagrammatic view diagrammatically showing the wrapping station;

FIGURE 9 is a side elevational view showing the crimper for crimping the wrapper to the end of a roll;

FIGURE 10 is a fragmentary end view of the crimper shown in FIGURE 9;

FIGURE 10a is a schematic illustration of a device for holding the heads against the ends of the rolls, such as may be used in a semi-automatic machine;

FIGURE 11 is a fragmentary end view of one of the inside headers looking at the header from the outside thereof;

FIGURE 12 is a fragmentary sectional view of the header shown in FIGURE 11 and taken substantially along line XII—XII of FIGURE 11;

FIGURE 13 is a fragmentary view showing the header in a backward tilted position, in position to receive a head to be placed on the end of a roll;

FIGURE 14 is a diagrammatic view diagrammatically showing the storage stations for heads to be applied to the ends of the rolls; and FIGURE 15 is a diagrammatic view diagrammatically illustrating the tracks for supplying heads to the inside and outside headers and taken substantially along line XI–XV of FIGURE 14.

In the embodiment of the invention illustrated in the drawings, I have diagrammatically shown in FIGURES 1 through 6 a feed conveyor 10 feeding a roll of paper to a wrapping line including a table 11 having a gauging and centering station 12, thereon, wrapper storage stands 13 spaced rearwardly of said conveyor, a feed roll stand 15 between the wrapper storage stands 13 and the conveyor 10 for supplying wrappers of varying widths, a shear 16 for shearing the wrapper to length, and tape conveyors 17 transporting the sheared wrapper to a gluing and wrapping station 19.

I have also known an inside heading and crimping station 20 spaced forwardly of the gluing and wrapping station 19, a banding station 21 banding the wrapped rolls while at the inside heading station, an outside heading station 23 spaced forwardly of the banding station, a weighing and printing station 24 spaced forwardly of the outside heading station, and a conveying station 25 conveying the wrapped roll for shipment or storage.

The feed conveyor 10 is shown in FIGURES 1 and 4 as comprising a frame 27 having a series of troughed rolls 28 spaced therealong and having relatively narrow belts 29 trained thereover and driven through a suitable motor and speed reducer mechanism (not shown). The frame 27 is pivoted to the table on pivot pins 30 extending transversely of said table and at one side of said frame, and is supported at the opposite side of said frame by a hydraulic jack 31 operable to lower the frame 27 about the pivot pins 30 and accommodate a roll of paper 33 to roll sidewise from said conveyor onto spaced transfer arms 35 forming in effect a cradle and transferring the roll 33 to troughed rolls 36 of the centering and gauging station 12. As generally shown in FIGURE 4, the transfer arms 35 are of a cradle-like form transversely pivoted intermediate their ends to the table 11 beneath the top thereof on pivot pins 39 and have rollers 40 rotatably mounted at opposite ends thereof. The transfer arms 35 are actuated by hydraulic jacks 41 transversely pivoted to the table 11 beneath the top thereof and having operative connection with lever arms 42 extending from said cradles adjacent the centers thereof. The cradles 35 thus catch or receive a roll of paper 33 and break the rolling action of the roll as it is rolled sidewise from the conveyor 10, and then transfer the roll onto the troughed rollers 36 of the centering and gauging station 12. Ejector arms 37 having rollers 38 on the outer ends thereof and transversely pivoted to the table 11 beneath the top thereof are provided to eject the roll of paper from the centering and gauging station to be transferred to the wrapping station 19. The ejector arms 37 are operated by hydraulic jacks 43 transversely pivoted to the table 11, beneath the top thereof, at one of their ends, and having pivotal connection with lever arms 44 extending from the ejector arms 37 at their opposite ends.

Similar cradles or transfer arms 45 transfer the roll 33 from the centering and gauging station to the wrapping station 19. Ejector arms 46 like the ejector arms 37 are provided to further transfer the roll and arm 99 further transfers the roll from the wrapping station to the inside heading and crimping station 20. Other types of transfer mechanisms may be employed.

It should here be understood that the top of the table 11 slopes from the receiving to the discharge end of the table and that the slope of the table is sufficient to allow the roll to roll by gravity between the various stations and that the transfer arms and ejector arms serve merely to transfer the roll between certain stations and control the speed of travel of the roll and to eject the roll to be transferred to a next advance station and may not be necessary in all instances. Air cushioned stops may also be used depending on nature of material being wrapped.

The roll wrapper of the present invention is particularly adapted for automatic operation under the control of IBM cards, punched tapes or magnetic devices or other suitable identifying elements. As, for example, when a roll of paper is brought up to the conveyor 10, an IBM card may be placed in a recording instrument (not shown). The recording instrument may stamp an identification number on the card and place this number in an electrical memory system. The automatic operation may then begin and the roll may then be released to the conveyor 10 to instigate the automatic wrapping operation. The control instrument from the signal on the IBM card can select the type of wrap (e.g. water proof, asphalt, or plain) number of layers, types of inside header, edge band and number of layers, etc.

When the completely wrapped roll arrives at the weighing and printing station, the outside head will be imprinted with the corresponding number that was on the data card identifying the contents. The scale imprinter will then produce a label with roll weight data and the corresponding identification number. This can be arranged to punch tape or an IBM card at the machine or remotely in the shipping office.

The wrapping and unwinding stand 13 is shown as forming a storage stand for a series of rolls of wrapping paper 47, 48, 49 and 50, supported in the stand for unwinding about horizontal transverse axes. Each roll of wrapping paper may be of a different width for wrapping a different width of roll of paper and the paper trained from each roll is trained about an individual idler 51 for each roll and supported on an endless conveyor belt 53, as the wrapper is trained to power driven pull rolls or pinch rolls 55 carried by the feed roll stand 15. One set of pinch rolls 55 is provided for each roll of wrapping paper. The pinch rolls may be driven by a constantly running motor 56 and individual electric clutches (not shown) are engaged to drive the desired pinch rolls in accordance with the width of paper required to wrap a roll of paper as selected at the gauging station 12.

Each paper web passes over a guide roll 55a and under a pull back roll 55b. Each pull back roll 55b is mounted to float vertically upwardly when a web is pulled forwardly, and is weighted to move downwarly when the web is cut and the clutch is simultaneously disengaged to release the drive rolls 55. The weighted pull back roll then will pull the leading end of the web away from the cutter, so that the cutter is clear for the next wrapper to be pulled forwardly, which may be of different width. The pull back rolls may, for example, be pivotally mounted, and may pull the web back by their own weight.

The wrapping paper to be unwound from its respective roll is guided under a roll 56 for a shear 16 shearing the wrapping paper to the length required to wrap a selected width and diameter of roll. The shear 16 includes a shearing blade 57 on a vertically movable crosshead 59 guided in a shear stand 60. The crosshead 59 is operated by a lever arm 61 operated by a fluid pressure operator jack 62 supplied with air through a suitable air valve (not shown), which may be sequentially controlled to shear the wrapper to the proper length in accordance with the diameter of the roll to be wrapped and number of layers desired.

The width of the wrapper as well as the length of the wrapper may be selected automatically or under manual control at the gauging and centering station 12. As diagrammatically shown in FIGURES 4 and 7, the guaging and centering station 12 generally comprises two vertically extending platens 64 mounted on the table 11 between the troughed rollers 36 and extending upwardly of the top of said table. Suitable means are provided for moving the platens 64 axially relative to the roll ends. Each platen 64 is mounted on a transversely movable rack 65 on a support 66 extending vertically of said rack. The racks 65 are meshed with pinions 67 driven by individual motors 69. The motors 69 may be speed reducer motors having speed reducers incorporated in the motor housing and are stopped by individual limit switches 70, 70 engaged by the platens 64, 64 when in their extreme outer positions. The platens are also stopped in their inner positions by two parallel connected limit switches 71, 71 each of which limit switches is mounted on a platen 64 for engagement with an end of a roll of paper to be wrapped. Another manner in which the heads may be operated is with a track, the platens being brought together by two nuts on a common shaft having a right and left hand thread driven by an air motor. When two limit switches on the platens are closed by contact with the roll, the roll is centered and the air motor reverses itself to return platens to the extreme position to receive a new roll.

The platens are driven at the same rates of speed to contact each other at the longitudinal center of the table 11. As the roll enters the centering and gauging station and closes the limit switch starting air motor (with the alternate device above), the platens 64 will be in their extreme outer positions. A circuit will then be completed to the motors 69, 69 through suitable switches (not shown). This will start the two roll centering platens 64, 64 to move across the table 11 toward the longitudinal center line of said table. As one platen 64 contacts the end of the roll, its limit switch will open. Movement of said platen inwardly, however, will continue to move the roll transversely of the table until the limit switch 71 on the opposite platen contacts the end of the roll. The actuation of the second limit switch will deenergize the two motors 69 and the roll will then be centered.

A suitable indicator (not shown) may then indicate the width of the roll to be wrapped and a control circuit may be established to energize a clutch driving a set of pinch rolls 55, to feed the web of wrapper determined by the width of the paper required to wrap the roll. The rolls will all be driven by a single motor operating constantly and selectively connected to the rolls by clutches. The pinch rolls retain contact with the web at all times.

The diameter of the roll may also be gauged at the centering and gauging station by a thickness transducer 73 mounted between the trough rolls 36 on the vertical center line of the roll being centered and gauged. The thickness transducer may be of a well known form and determines the length of the paper wrapper by a time delay in the wrapper cut-off knife 57. When the transducer probe is in its fully retracted position there will be the equivalent of a zero time delay and as the probe is advanced toward the roll the point of contact of the probe with the roll can represent a specific time delay other than zero. Since the largest roll diameter represents the minimum of curvature, the probe must travel farther to engage the roll and is at a maximum extension at this point, giving a maximum time delay in operation of the cut-off knife and a maximum wrapper length.

A suitable timer (not shown) may be provided in the circuit to shear and the timer may be so selected that the timing, and consequently the wrapper length, is a composite of the diameter of the roll plus a fixed percentage of approximately 15%. This enables the timer to give an additional length for an overlap which is required on a single wrap.

At the centering and gauging station, suitable controls may be provided to select the number of wraps about the roll. This may be a manual selection, semi-automatic or fully automatic arrangement.

In addition to the selection of the wrapper width, the selection of the wrapper length, the selection of the number of wraps, the selection of the head size as well as the selection of the inside and outside heads and the number of reinforcing bands and the location of the bands may be made at this station. These selections may be made either automatically or manually, if desired.

It should here be understood that while I have shown a centering station separate from the conveynig station that the centering and conveying stations may be combined in a single station, if desired. In such an application the conveyor would be controlled to center the rolls of paper. The infeed conveyor may be located between the drums and either the drums or the conveyor will be raised and lowered as required. In this case the centering and gauging station would be located outside the wrapper before the rolls are placed on the infeed conveyor. In this arrangement the conveyor would be indexed from station to station to maintain a centerline relationship.

The wrapper passes from the shear to the gluing and wrapping station 19 between upper and lower tape conveyors 75 and 76, having individual take ups 77 and 78, respectively, therein. The tape conveyors may be driven by suitable motors and are of a well known form so need not herein be shown or described in detail.

As shown in FIGURE 8, the tapes of the lower tape conveyor 70 passes about the front direction changing roller 79 for the top tape conveyor 75 between the tapes thereof, for conveying the wrapper sheared to length upwardly along a guide 80 extending to a support roll 81 for the roll of paper 33 being wrapped. The lower tape conveyor 76 then turns about an idler 82 spaced above the guide 80 and the return run of said conveyor turns about an idler 83 and backwardly toward the shear 16.

The guide 80 may comprise a guide plate 85 tangential with the direction changing roller 79 and the roll supporting roller 81, and also may include a series of guide strips 86 spaced outwardly from the guide plate 85 retaining the wrapper to said guide plate and guiding the wrapper to the nip between the support roll 81 and the roll of paper 33. The guide strips 86 may be a series of spaced wires or may be strips made from Teflon or a like material.

A series of glue guns 87 are mounted on a carriage 88 and are operable to spray strips of glue across the wrapper adjacent the leading and trailing ends of the wrapper, and on the face of the wrapper facing the roll being wrapped, to cause the wrapper to adhere to the roll as the wrapper passes in the nip between the roll being wrapped and the support roll 81. As shown in FIGURES 4 and 8, the carriage 88 is mounted on grooved wheels 89, 89 guided for movement along a track 90 extending along the floor transversely of the table 11 and beneath the top thereof. The carriage also contains a tank 91 for glue and may further have a pump (not shown) mounted thereon drawing glue from the tank 91 and supplying glue to the guns 87. As an alternate, a fixed bank of gluing heads may be employed covering the entire width and controllable by individual supply valves so that end heads may be cut off for smaller widths.

The glue guns 87 may include individual valves (not shown) associated with each glue gun and operated by air or solenoids to place a leading glue swatch on the leading edge of the wrapper and a trailing glue swatch on the end of the wrapper. Actuation of the valves may be under automatic control.

The gluing and wrapping station also includes a support roll 93 of the same diameter as the roll 81 and spaced rearwardly therefrom. The rolls 81 and 93 support the roll 33.

An arm 99 ejects the roll 33 to move to the next station. The arm is pivoted upwardly by a cylinder 96 and pivots on shaft 95 so that plate 100 lifts up under the roll.

The roll 81 is driven from a motor and speed reducer 101 in a suitable manner to rotatably drive the roll of paper 33 and wrap the wrapper thereabout by the adhesion of the leading end of the wrapper to the roll and successively passing the wrapper along the nips between the roll 33 and the rolls 81 and 93. The roll may be rotated for as many complete revolutions as desired with only 1½ revolutions required to set the glue.

When rotation of the roll 33 is stopped, fluid under pressure may be admitted to the jack 96 to tilt the cradle about the axis of the shaft 95. The ejector arm 46 may also be operated to engage the roll 33 and push the roll from the rollers 81 and 93 to move by gravity to the inside header station 20.

At the inside header station 20, the roll comes to rest on spaced support and drive rolls 103, 103. Heads may then be applied to opposite ends of the roll 33 and the projecting end portions of the wrapper may be crimped inwardly along the ends of the roll along the outsides of the heads. The rolls 103, 103 may be rotatably driven by power by a motor (not shown) during the crimping operation in a suitable manner.

The inside header station includes an elevator 104 (FIGURE 14) containing round disks of paper or other material, piled in stacks, each stack consisting of one diameter disk. An elevator is provided on each side of the table 11. The elevators 104 are suitably guided for vertical movement along a frame structure as the disks are picked up by vacuum pick-up devices 106.

The paper roll dimensions having been established at the gauging station, as soon as the roll enters the wrapping station, the vacuum pick-up devices may be indexed over the proper piles of head disks.

At this time, a limit switch (not shown) is actuated to lower the vacuum pick-up unit into the pile of head disks. The vacuum system is then activated and the vacuum intake apertures in the unit causes a disk to adhere to the surface of a pick-up as the pick-up unit is raised and held in a ready position.

The vacuum pick-up units 106 are mounted on and depend from a frame structure 107, arranged to position the vacuum pick-up units along the disks on the elevator 104 to pick-up selected disks from the elevator as the elevator is raised to the vacuum pick-up units. The frame structure 107 is shown in FIGURE 15 as being horizontally pivoted to a carriage 109 on a pivot 110. A hydraulic jack 111 is provided to tilt the frame structure 107 to conform to a delivery guide track 112 leading downwardly to a header platen 113 for guiding a head to said platen to be stopped in position on said platen by spaced stops 102, 102 at the bottom of said platen. The carriage 109 is shown as being suspended from an I-beam 115 on spaced wheels 116 which may engage and ride along the flanges of the I-beam on opposite sides of the web thereof. A suitable power unit 114 movable along a track 114a is provided to move the carriage 109 along the I-beam from the elevator 104 to the inclined guide track 112 to deposit heads thereon, and to return said carriage to said elevator. The power unit 114 is connected with the carriage 109 by a link 108 and may be of any form well known to those skilled in the art and is no part of the present invention so need not herein be shown or described further.

Two inside heading platens 113 are provided and located on each side of the paper roll 33 when supported on the spaced rollers 103, 103 and centered with respect to the center of said roll. The two heading platens are of a similar construction and are operated in a similar manner so only one need herein be shown and described.

The inside heading platen 113 comprises a central plate 117 which may be circular in form, and extension fingers 118, 118, 119, 119 and 120 extending radially of said plate and retractible in accordance with the diameter of roll being wrapped, to accommodate the platen to pass within the end portion of the wrapper projecting outwardly beyond the end of the roll and engage a header disk carried by said platen with the end of the roll. As shown in FIGURES 5, 12 and 13, the plate 117 is fixedly mounted on the end of a support member, shown as being in the form of a shaft 121 extending within and mounted in a hub 122 of a pivoted support frame 123. The plate 117 has nozzle openings 125 opening through the face thereof, facing the end of the roll and communicating with passageways 126 having communication with a central passageway 127 leading along the shaft 121. The passageway 127 is connected with a source of vacuum (not shown) through a fitting 199 and vacuum line 130. When the nozzle openings 125 are connected with a source of vacuum and a head is in position on the plate 117, the vacuum will hold the head to the plate for application to the end of a roll of paper. After the application of the head to the roll of paper, the nozzles 125 may be connected to a source of pressure under the control of suitable valve means (not shown) to hold the head in position on the end of the roll as the platen 115 is withdrawn from the head.

The support frame 123 is transversely pivoted to a bracket 131 mounted on the end of a piston rod 132 extensible from a cylinder 133. As shown in FIGURES 12 and 13, a transverse pivot pin 135 pivotally connects the hub 122 of the support member 123 to the upper end portion of the bracket 131. The cylinder 133 is mounted on the table 11 outside of the path of travel of the rolls therealong, on a support structure 136 and serves to move the platen 113 toward and from the end of the roll upon the admission of fluid under pressure to the head and piston rod ends of said cylinder, and to tilt said platen backwardly in position to receive a head moving downwardly along the track 112.

The platen 113 is tilted backwardly with respect to the end of the roll by means of spaced tilting cams 137, mounted on and projecting upwardly of the top of the table 11, and spaced outwardly of the end of the roll. The tilting cams 137 are engaged by follower rollers 139 riding along the top of the table 11 upon extension of the platen 113 toward the end of the roll and riding upwardly along said cams upon retractible movement of said platen. As shown in FIGURES 12 and 13, the follower rollers 139 are mounted on the lower ends of links 140, transversely pivoted to opposite sides of the support member 123, intermediate the ends thereof, on pivot pins 141. Control links 143 retain the links 140 in vertically extending positions and are pivotally connected with said links or pivot pins 144 forming supports for the rollers 139 and with the lower end portion of the bracket member 131 on opposite ends of a shaft 145 mounted on said bracket member intermediate its ends. Thus, as the piston rod 132 is retractibly moved within the cylinder 133, the follower rollers 139 will ride upwardly along the tilting cams 137 and tilt the platen 113 into the position shown in FIGURE 13, in position to receive a header disk.

The shaft 121 has a collar 146 mounted thereon and retained from rotatable movement with respect thereto as by a key 147. The collar 146 has a series of spaced lugs 149 extending radially therefrom forming individual connectors for the extension arms 118,118; 119,119 and 120 each arm extending within the space between a pair of lugs. As shown in FIGURE 12, the extension finger 120 has an inner angularly extending arm 150 having a slot 151 extending therealong engaged by a pivot pin 152 mounted at its outer ends in a pair of lugs 149.

A fluid pressure cylinder 153 having a piston rod 154 extensible therefrom is provided to hold the extension finger 120 in the solid line position shown in FIGURE 12 and to move said extension finger into the retracted position shown by broken lines in this figure when heading rolls of smaller diameter than the rolls headed, when the extension finger 120 is in its extended position. The piston rod 154 has a link 155 pivotally connected to its free end. The link in turn is pivotally connected to the arm 150 of the extension finger 120 on a pivot pin 156. A vacuum nozzle 157 is mounted at the outer end portion of extension finger 120 and is connected with a source of vacuum through a vacuum line 159. The vacuum line 159 may be connected to a source of vacuum through suitable valve means (not shown) which may also be connected with a source of pressure for retaining the head to the end of the roll, as the platen is withdrawn from the end of the roll.

The extension fingers 118, 118 and 119, 119 are pivotally mounted between lugs 149, 149, extending outwardly of the collar 146 in the same manner the extension finger 120 is pivotally connected thereto, and are retained in position parallel to the plate 117 and are retractibly moved with respect to said plate by individual hydraulic cylinders and pistons 160, 160 and 161, 161, respectively, in the same manner the extension finger 120 is mounted on the collar 146 and retained in extended relation with respect to the plate 117 and retractibly moved with respect to said plate so the description of the mountings and actuating means for said last mentioned extension fingers need not be shown or described in detail. The extension fingers 118, 118 and 119, 119 likewise have vacuum nozzles 163, 163, and 164, 164, respectively, opening toward the end of the roll and connected with a source of vacuum under suitable valve means (not shown), which may also supply pressure to said nozzles to retain the head in position during the operation of crimping the overhanging end portions of the wrapper inwardly along the ends of the heads.

In heading a large diameter roll, all of the fingers 118, 119 and 120 will be extended. In heading smaller diameter rolls, however, the fingers are retracted in accordance with the diameter of the roll being headed, to accommodate the platen 113 to move within the overhanging end portion of the wrapper to apply a head to the end of the roll. The finger or paddle 120 is hinged at 120a and held straight for large rolls or broken at the hinge 120a with the upper end 120c tipped back. The paddle 120 is either held straight or broken by an air cylinder and piston 120b.

This mechanism is only required on a fully automatic unit. Heads are placed manually in semi-automatic arrangements.

On semi-automatic arrangements two air jets may be directed into end of roll to hold stiff heads in place until crimped.

As shown in FIGURE 10a, a head 281 is positioned against the end of a roll 280 and held in place by air jets 282 and 283 which are directed toward the center of the end of the roll and are crossed. I have discovered that if a straight air jet is used which is directed axially toward the end or which is directed near the edges of the head, the air flowing away from the edges of the heads draws the edges axially outwardly and prevents the heads from continuing to lay flat against the roll ends. By crossing the air jets, the flow of air is inwardly at the edges of the heads and the edges remain against the end of the roll.

A separate crimper, for crimping the wrapper about each end of the roll and the head thereon is mounted on each side of the table 11 rearwardly of the heading platens 113, 113. As shown in FIGURES 9 and 10, each crimper is mounted on a carriage 165, movable transversely of the table 11 toward and from the ends of a roll of paper supported on the rolls 103, 103. The carriage 165 has a top plate 167 spaced above the top of the table 11, and has spaced wheel brackets 169 depending therefrom through transverse slots 170 on a table top. The wheel brackets 169 form bearing supports for grooved wheels 171 riding along V-shaped guide tracks 173 guiding the carriage 165 for movement toward and from the center of the table 11. A guide member 174 extends from the bottom of the plate 167 through a slot 175 in the top of the table 11 and has a depending tongue 176 guided in an upwardly facing grooved guide 177 suitably secured to the table 11 beneath the top thereof. The opposite end of the plate 167 from the rollers 171 is supported on rollers 178 riding along the top of the table 11.

A crimping wheel 179 is rotatably mounted on the end of an arm 180 on a shaft 181. The arm 180 is transversely pivoted to a bearing support member 183 on a pivot pin 184. The bearing support 183 is mounted on the top of the plate 167 and projects upwardly therefrom. An arm 185 is mounted on the shaft 181 supporting the crimper 179 and extends outwardly of the arm 180 and crimper 179 and has a drive wheel 186 rotatably mounted on its free end on a shaft 187. The drive wheel 186 is shown as having a rubber tire 188 mounted thereon engaging the periphery of the roll being wrapped and driven therefrom. A belt drive 189 is provided to drive the crimper wheel 179 from the wheel 186 at a higher rate of speed than the linear speed of the roll periphery.

The shaft 181 ssupporting the crimping wheel 179 is shown as having a guide roll 198 on the end thereof, which may be rubber covered and serves as a guide roll for the crimping wheel. The crimping wheel 179 is also shown as having a plurality of backwardly slanted crimping fingers 179a extending therefrom with pivoted fingers 179b extending between certain of said crimping fingers and pivoted for movement with respect to the fingers 179a on pivot pins 179c. The fingers 179b have follower rollers 179d rotatably mounted thereon riding along a stationary annular cam 179e extending about the shaft 181 and controlling the positions thereof for crimping.

The arm 180 and 185 are yieldably held in the retracted position shown in FIGURE 9 by a tension spring link 190 pivotally connected at its free ends to arms 191 and 192 extending from the arms 180 and 185 respectively, at generally right angles with respect thereto. A fluid pressure operated cylinder 193 having a piston rod 194 extensible therefrom is provided to move the rubber tire 187 into engagement with the periphery of a roll 33 rotatably supported on the rollers 103, 103 and rotated by said rollers to drive the crimping wheel 179 and thereby crimp the wrapper over the ends of the roll of paper being wrapped. The cylinder 193 is transversely pivoted adjacent its head end on the plate 167 on trunnion supports 195. The piston rod 194 is in turn pivotally connected to an ear 196 extending downwardly from the arm 180 intermediate the ends thereof, on a pivot pin 197.

After the inside heads have been placed on the ends of a roll of paper, the crimper wheels 179 are moved inwardly along the table 11 to a crimping position. Fluid under pressure, such as air, may then be admitted to the head ends of the cylinders 193 to move the rubber tires 188 into engagement with the periphery of the roll and to extend the spring links 190 and accommodate the tension of the springs to maintain the rubber tires in engagement with the periphery of the roll 33 and positively drive the crimping wheels 179 at a greater speed than the peripheral speed of the roll, to crimp the overhanging end portions of the wrapper into engagement with the ends of the roll 33 and the inside heads thereon. It is possible to crimp from 4" to 8" overlap thus providing an 8" width variation range of rolls that may be wrapped with each wrapper size.

The banding station 21 is spaced forwardly of the inside heading and crimping station and includes individual reels of tape 199 for each end of the roll and rotatably mounted between upright standards 200, extending upwardly of a plate 201 guided for movement along the top of the table toward and from the center of the table and retained in position and moved transversely of the table by a fluid pressure jack 202 disposed beneath the top of the table 11. The jack 202 is shown as being trunnioned between the spaced arms 203 depending from the bottom of the table top and secured thereto. The jack 202 is fixedly connected to a drive member 204, at its end opposite the arms 203. The drive member 204 depends from the plate 201 through a guide slot in the table top. The standards 200 also support a pair of feed rolls 207 in the form of pinch rolls, a shear knife 209 and a glue gun 210. The pinch rolls 207 may be driven by a speed reducer motor 211 in a suitable manner, while the shear-knife may be operated by a fluid pressure jack 212 in timed relation with respect to rotation of the drum 33, to shear the tape to length.

The glue gun 210 may include suitable valve means (not shown) to effect the spraying of glue on the side of the tape facing the drum 33 to effect the application of the tape to the wrapper on the roll 33, as the glued tape passes into the nip between the drum 33 and its advance support roll 103.

In carrying out the banding, crimping and inside heading operations, assuming header disks have been supplied to the platens 113, 113 and are held thereto by vacuum, the platens are then tilted to their vertical positions by inward movement of the piston rods 132 moving the followers 139 downwardly along the tilting cams 137 onto the surface of the plate 11. The platens will then be moved inwardly in their vertical positions until the header disks engage the ends of the roll 33. Air pressure is then applied to hold the heads in place and the platens are withdrawn to an intermediate position to provide clearance for the crimping operation.

As the inside header plattens move inwardly, the banders are likewise moved into position to provide a predetermined length of band to opposite ends of the wrapped roll. At the same time the crimpers move into crimping position with the crimping wheels moving inwardly along opposite ends of the roll to be driven by the rubber tires 188. During this operation the rol is slowly rotated by the rollers 103, 103, and the crimping disks and fingers fold the wrapper around the ends of the paper roll and over the heads placed thereon. These operations are herein shown in one station but may be located at different stations and done independently, as determined by production rate demands and time cycles. After the crimping operation, the crimped roll is rotated for one or more revolutions, while the header platens 113 retract to a rest position and may contact a limit switch which turns off the air jets. The roll is now ready for ejection and movement into the outside heading station.

At the termination of the crimping, banding and insider heading operation the banders 21 are moved laterally out of the way of the roll and the roll is ejected from the rollers 103, 103.

At the termination of the inside heading, crimping and banding operation, an ejector shoe 205 between the rolls 103, 103 is moved vertically by a fluid pressure jack 106 to eject the roll 33 from the rollers 203, 203 and cause the roll to roll downwardly along the sloping top of the table 11 to stop between and be supported on rolls 217, 217 at the outside heading station, for the application of heads to the crimped wrapper crimped over opposite ends of the roll. The outside heading station is similar to the inside heading station and head disks of the proper size are selected by vacuum pick-ups 219 supported on and depending from a carriage 220, and picking up disks of the selected size, stored on an elevator 221. The elevator 221, pick-ups 219 and carriage 220 are the same as the elevator 104, vacuum pick-ups 106 and carriage 109 so the description thereof need not be repeated herein.

A vacuum pick-up 219, picking up a disk of the proper size transfers the disk to a sloping guide track 223 sloping toward a backwardly tilted header platen 224. As the selected disk is deposited on the inclined guide track 223, it moves downwardly therealong by gravity between back up rolls 226 on a shaft 225 and glue rolls 227 on a shaft 229. The back up rolls 226 are driven by power in a suitable manner and the glue rolls 227 are supplied with glue from rolls 230, rotatably driven to rotate within a glue pan 231, and engaging and rotatably driving applicator rolls 232, applying glue to the glue rolls 227 in a conventional manner. If the leads were manually applied in a semi-automatic operation they could be glued such as by putting on a turntable. As the disk passes between the back up rolls 225 and glue rolls 227, it moves downwardly along the track 223 onto and along the backwardly tilted platen 224 into engagement with a stop 234 at the lower end thereof. The platen 224 is trunnioned on a carriage 233 suitably moved toward and from the end of the roll, to apply pressure thereto and apply a glued head on the platen to the end of the roll. The platens 224 may be tilted and may be advanced and retracted with respect to the ends of the roll by operation of fluid pressure jacks 224a in a manner similar to which the platens 113 are tilted and extensibly and retractibly moved with respect to the ends of the roll. The detailed mountings of said platens 224 and the fluid pressure jacks for tilting and moving said platens toward and from the ends of the roll need not be repeated herein.

It should also be understood that the platens 224 are provided with vacuum nozzles to retain the header disks thereto and that heat may be supplied to the platens to heat the header disks and set the adhesive of the disks prior to the returning of the header carriages 223 to their retracted reset positions.

If desired, a center band may be applied to the roll at this station by a banding device similar to the banding devices at the banding station 21, and not shown or described herein.

Upon the completion of the operation of wrapping a roll 33 at the outside heading station, an ejector plate 235, beneath the bottom of the roll and actuated by a fluid pressure jack 236 may eject the roll from the outside heading station to move downwardly along the sloping table to the weighing station 24 and come to rest at the weighing station on rolls 237, 237 suitably supported on a scale 239 of a conventional form. The scale 239 may have a printing die which automatically stamps the roll weight on a label having a corresponding number which has been imprinted on the roll and on the roll ticket at the control station as the roll is deposited on the conveyor 10.

At the termination of the weighing operation, an ejector plate 239 actuated by a fluid pressure jack 240 is moved upwardly into engagement with the roll to eject the roll from the rollers 237, 237 and effect movement of the roll downwardly along the sloping table top onto an exit conveyor 241. The exit conveyor may transport the wrapper roll to a storage warehouse or to a shipping area.

It will, of course, be understood that while the drawings and description have in many instances set forth preferred mechanical arrangements, other mechanical structures may in certain cases be substituted without varying from the principles of the invention.

In the operation of the machine each station can be controlled manually if desired. In automatic operation the machine sets the pace rather than the operator and interconnections will be provided between each of the stations so that the operation which takes the longest length of time will dictate the pace of the machine. Thus, in effect, the machine controls itself, and measures the size of the rolls, including length and diameter at the centering station, which in turn sends a signal to the wrapper feed. The end paddles control the width of wrapper selected and the diameter mechanism controls the length. An original signal fed into the machine will determine the type of wrapper where multiple wrapping materials are available and a numbering device will place a stamp on the header at the end of the wrapping line in accordance with the original identifying signal placed on the machine. By providing multiple stations for individual operations a dexterity of arrangement is obtained for rearrangement of locations of stations in accordance with space available in the mill.

While I have herein shown and described one form in which my invention may be embodied, it may readily be understood that various variations and modifications in the invention may be attained without departing from the spirit and scope of the novel concepts thereof as defined by the claims appended hereto.

I claim as my invention:

1. In an apparatus for wrapping rolls of paper and the like, a wrapper storage stand rotatably supporting at least one roll of wrapping paper, a feed and cut-off stand feeding a predetermined length of paper from said roll and shearing the paper to length, to form a wrapper, a conveyor station conveying a roll of paper for wrapping, means adjacent said conveyor station for centering the roll with respect to its wrapper, a wrapping stand comprising spaced support rolls supporting a roll of paper therebetween, and means for rotatably driving at least one of said rolls for rotatably driving the roll of paper, means progressing a roll of paper to be wrapped to said wrapping station, to be supported on said rolls, feeding means feeding and guiding a sheared wrapper to the nip between the roll of paper and one of said supporting rolls, a gluing station adjacent said feeding station, applying strips of glue to the wrapper adjacent the leading and trailing ends thereof and on the face thereof facing the roll of paper, to be applied to the roll by the pressure of the roll of paper thereon as the wrapper passes into and past the nips between said supporting rolls and the roll of paper.

2. In an apparatus for wrapping rolls of paper and the like, a wrapper storage strand rotatably supporting at least one roll of wrapping paper, a feed and cut-off stand feeding a predetermined length of paper from said roll and shearing the paper to length, to form a wrapper, a conveyor station conveying a roll of paper for wrapping, means adjacent said conveyor station for centering the roll with respect to its wrapper, a wrapping stand comprising spaced support rolls supporting a roll of paper therebetween, and means for rotatably driving at least one of said rolls for rotatably driving the roll of paper, means progressing a roll of paper to be wrapped to said wrapping station, to be supported on said rolls, feeding means feeding and guiding a sheared wrapper to the nip between the roll of paper and one of said supporting rolls, a gluing station adjacent said feeding station, applying strips of glue to the wrapper adjacent the leading and trailing ends thereof and on the face thereof facing the roll of paper, to be applied to the roll by the pressure of the roll of paper thereon as the wrapper passes into and past the nips between said supporting rolls and the roll of paper, means crimping the wrapper to opposite ends of the roll, and means spaced forwardly of said crimping means for applying glued heads to the wrapper crimped along opposite ends of the roll.

3. In an apparatus for wrapping rolls of paper and the like, a wrapping station comprising a pair of longitudinally spaced support rolls supporting a roll of paper for wrapping, means rotatably driving at least one of said support rolls for effecting rotation of the roll of paper thereon, other means supplying a wrapper to the nip between the roll of paper and one of said support rolls, and applying glue to the wrapper adjacent the leading and trailing ends thereof and on the side thereof facing the roll of paper, to effect wrapping of the roll of paper by adhesion of the glue thereto and rotation of the roll along said support roll, and means spaced rearwardly of said wrapping station for centering the roll with respect to the wrapping station and gauging the width of the paper to be wrapped thereon, comprising two platens guided for movement toward the extended center line of said wrapping station, means driving said platens toward each other at the same rates of speed, and other means controlling inward movement of said platens and stopping inward movement thereof only when said platens are centered with respect to said wrapping station, comprising individual limit switches on each platen and actuated upon contact of said switches with the roll of paper, said switches being connected in parallel and only stopping inward movement of said platen upon actuation of both of said switches.

4. In an apparatus for wrapping rolls of paper and the like, a wrapping station comprising a pair of longitudinally spaced support rolls supporting a roll of paper for wrapping, means rotatably driving at least one of said support rolls for effecting rotation of the roll of paper thereon, other means supplying a wrapper to the nip between the roll of paper and one of said support rolls, and applying glue to the wrapper adjacent the leading and trailing ends thereof and on the side thereof facing the roll of paper, to effect wrapping of the roll of paper by adhesion of the glue thereto and rotation of the roll along said support roll, and means spaced rearwardly of said wrapping station for centering the roll with respect to the wrapping station and gauging the width of the paper to be wrapped thereon, comprising two platens guided for movement toward the extended center line of said wrapping station, means driving said platens toward each other at the same rates of speed, and other means controlling inward movement of said platens and stopping inward movement thereof only when said platens are centered with respect to said wrapping station, comprising individual limit switches on each platen and actuated upon contact of said switches with the roll of paper, said switches being connected in parallel and only stopping inward movement of said platen upon actuation of both of said switches, and gauge means gauging the diameter of the roll and thereby determining the length of wrapper to be wrapped about the roll.

5. In an apparatus for wrapping rolls of paper and the like, a wrapping station comprising a pair of support rolls supporting a roll of paper for wrapping, means driving at least one of said rolls to effect rotation of the roll of paper supported thereon, other means supplying a wrapper to the nip between the roll of paper and one of said rolls and applying glue to the wrapper adjacent its leading and trailing ends and on the side thereof facing the roll of paper, to effect wrapping of the roll of paper by adhesion of the glued wrapper thereto upon rotation of the wrapper by said support rolls, means driven by the roll of paper and crimping the wrapper about opposite ends thereof, a header station spaced forwardly of said wrapping station for applying heads to the paper crimped about opposite ends of the roll comprising heading platens spaced from opposite ends of the roll and tilted backwardly about their lower end portions, to accommodate a head to be placed thereon, and means pivoting said platens in parallel relation with respect to the ends of the roll and moving said platens towards the roll to apply heads thereto.

6. In an apparatus for wrapping rolls of paper and the like, a wrapping station comprising a pair of support rolls supporting a roll of paper for wrapping, means driving at least one of said rolls to effect rotation of the roll of paper supported thereon, other means supplying a wrapper to the nip between the roll of paper and one of said rolls and applying glue to the wrapper adjacent its leading and trailing ends and on the side thereof facing the roll of paper to effect wrapping of the roll of paper by adhesion of the glued wrapper thereto upon rotation of the wrapper by said support rolls, means driven by the roll of paper and crimping the wrapper about opposite ends thereof, a header station spaced forwardly of said wrapping station for applying heads to opposite ends of the roll, comprising heading platens spaced from opposite ends of the roll and pivoted adjacent their lower end portions for titlting movement about their lower end portions to accommodate a head to place thereon, pressure means pivoting said platens inwardly into parallel relation with respect to the ends of the roll and engaging a glued head to the wrapper crimped about the ends of the roll and applying the head thereto.

7. In an apparatus for wrapping rolls of paper and the like, a wrapping station comprising a pair of support rolls supporting a roll of paper for wrapping, means driving at least one of said rolls to effect rotation of the roll of paper supported theron, other means supplying a wrapper to the nip between the roll of paper and one of said rolls and applying glue to the wrapper adjacent its leading and trailing ends and on the side thereof facing the roll of paper to effect wrapping of the roll of paper by adhesion of the glued wrapper thereto upon rotation of the wrapper by said support rolls, means driven by the roll of paper and crimping the wrapper about opposite ends thereof, a header station for applying heads to opposite ends of the roll comprising heading platens spaced from opposite ends of the roll and mounted for tiltable movement about axes extending transversely of the axis of the roll, means tilting said platens backwardly about said axes to accommodate a head to be placed thereon, suction passageways in said platens opening toward the ends of the roll for holding a head to be applied to the roll, said suction passages serving as pressure passages for holding the heads in engagement with the ends of the roll as said platens are moved away from the roll.

8. In an apparatus for wrapping rolls of paper and the like, a wrapper storage stand, a pair of pinch rolls feeding wrapping paper from said storage stand, a shear spaced forwardly of said storage stand for shearing the wrapper to length, a wrapping station spaced forwardly of said shear and storage stand and including means supplying a wrapper to the roll to be wrapped and applying glue to the wrapper adjacent the leading and trailing ends thereof on the side of the wrapper facing the roll, a centering station spaced rearwardly of said wrapping station for centering the roll with respect to the center line of said wrapping station, a heading station spaced forwardly of said wrapping station for applying glued heads to opposite ends of the roll, comprising heading platens pivotally mounted adjacent their lower ends for movement about axes extending transversely of the axis of rotation of the roll, means tilting said platens backwardly about their lower end portions to accommodate a head to be placed thereon, suction passages in said platens opening toward the ends of the roll for holding a head during application of the head to the roll, said suction passages serving as pressure passages for holding the heads in engagement with the ends of the roll, and crimping means at said header station for crimping the wrapper along said heads.

9. In an apparatus for wrapping rolls of paper and the like, a wrapper storage stand, a pair of pinch rolls feeding wrapping paper from said storage stand, a shear spaced forwardly of said storage stand for shearing the wrapper to length, a wrapping station spaced forwardly of said shear and storage stand and including means supplying a wrapper to the roll to be wrapped and applying glue to the wrapper adjacent the leading and trailing ends thereof on the side of the wrapper facing the roll, a centering station spaced rearwardly of said wrapping station for centering the roll with respect to the center line of said wrapping station, a heading station spaced forwardly of said wrapping station for applying glued heads to opposite ends of the roll, comprising heading platens pivotally mounted adjacent their lower ends for movement about axes extending transversely of the axis of rotation of the roll, means tilting said platens backwardly about their lower end portions to accommodate a head to be placed thereon, suction passages in said platens opening toward the ends of the roll for holding a head during application of the head to the roll, said suction passages serving as pressure passages for holding the heads in engagement with the ends of the roll, crimping means at said header station for crimping the wrapper along said heads, an outside header station spaced in advance of said first mentioned header station comprising heading platens spaced from opposite ends of the roll and pivotally mounted for backward tilting movement with respect to the ends of the roll to accommodate a head to be placed thereon, suction passages in said platens open towards the ends of the roll for holding a head to be applied to the roll, means applying glue to the heads prior to placing on said platens and means tilting said platens toward the roll to apply the glued heads to the paper crimped about the ends of the roll.

10. In an apparatus for applying heads to rolls of paper and the like in the operation of wrapping the roll, a frame, means supporting a roll of paper on said frame, header platens mounted on said frame at opposite ends of said support means for tilting movement with respect to the ends of a roll supported on the ends of said supporting means about axes extending transversely of the axis of the roll of paper, cylinder and piston means for tilting said platens with respect to the roll of paper and pressing said platens and the heads thereon into engagement with the ends of the roll of paper, the mountings for said platens on said cylinder and piston means, each comprising a support bracket mounted on an associated cylinder and piston means for movement toward and from the end of the roll of paper, a frame transversely pivoted to said bracket adjacent the upper end portion thereof, a rigid connection from said frame to an associated platen, cam and follower means between said first mentioned frame and said second mentioned frame for tilting said second mentioned frame and platen backwardly upon movement of said platen away from the end of the roll and supporting said second mentioned frame for rectilinear movement toward the end of the roll, stop means on said platen regulating the position of a head thereon, and suction passages opening through the face of said platen adjacent the end of the roll for retaining a head to said platen, said suction passages also serving as pressure passages supplying fluid under pressure to retain the head to the roll upon retractible movement of the platen with respect to the head.

11. In an apparatus for applying heads to opposite ends of rolls of paper and the like in the operation of wrapping the roll, a frame, means supporting a roll of paper on said frame, header platens mounted on said frame for movement toward and from opposite ends of the roll supported on said rolls, the support for said platen on said frame and the means for moving said platen toward and from the ends of the roll comprising a fluid pressure motor mounted on said frame for movement toward and from the end of the roll thereon, a bracket on the end of said motor, a support transversely pivoted to said bracket, adjacent the upper end portion thereof, a shaft mounted in said support and projecting therefrom toward the end of the roll, the free end of said shaft having a platen mounted thereon, a link pivotally connected to said support and having a follower on the lower end thereof riding along said frame, a second link pivotally connecting said link with said bracket to control the position of said link and follower, a cam engaged by said follower upon movement of said platen away from the end of the roll and tilting said support and plate backwardly upon retractible movement of said platen and positioning said platen into position for mounting, and vacuum openings in said platen for retaining the head thereto.

12. In an apparatus for applying heads to opposite ends of rolls of paper and the like during the operation of wrapping the roll, a frame, means supporting a roll of paper on said frame, spaced header platens mounted on said frame for movement toward and from the ends of a roll of paper on said supporting means and for backward tilting movement with respect to the ends of the roll, a mounting for each platen comprising a fluid pressure jack, a bracket on the end of said jack and moved thereby toward and from the associated end of a roll on said supporting means, a support frame transversely pivoted to said bracket adjacent the upper end thereof, a support member mounted on said support frame and projecting therefrom toward a roll end and having a platen fixedly mounted on the forward end thereof, cam and follower means effecting backward tilting movement of said support member and platen and retractible movement of said platen with respect to a roll end, said platen including a plate rigidly mounted on said shaft and a plurality of extension fingers of different lengths forming radial continuations of said plate, and means mounting said fingers for retractible movement with respect to said plate to vary the diameter of said platen in accordance with the size roll being wrapped.

13. In an apparatus for applying heads to opposite ends of rolls of paper and the like during the operation of wrapping the roll, a frame, means supporting a roll of paper on said frame, spaced header platens mounted on said frame for movement toward and from the ends of a roll of paper on said supporting means and for backward tilting movement with respect to the ends of the roll, a mounting for each platen comprising a fluid pressure jack, a bracket on the end of said jack and moved thereby toward and from the associated end of a roll on said supporting means, a support frame transversely pivoted to said bracket adjacent at the upper end thereof, a support member mounted on said support frame and projecting therefrom toward a roll end and having a platen fixedly mounted on the forward end thereof, cam and follower means effecting backward tilting movement of said support member and platen and retractible movement of said platen with respect to a roll end, said platen including a plate rigidly mounted on said shaft and a plurality of extension fingers of different lengths forming radial continuations of said plate, means mounting said fingers on said support member for retractible movement with respect to said platen to vary the diameter of said platen in accordance with the diameter of the roll being wrapped, individual cylinder and piston means connected between said support frame and each of said fingers for extensibly and retractibly moving said fingers with respect to said plate, and retaining said fingers in extended and retracted positions.

14. In an apparatus for applying heads to rolls of paper and the like in the operation of wrapping the roll, a frame, a storage station for heads for the ends of the roll on each side of said frame, vacuum pick-ups for picking up selected heads, support means on said frame, between said storage stations, supporting a roll of paper on said frame for heading, header platens mounted on said frame at opposite ends of said support means, means mounting said header platens on said frame for movement towards and from the ends of said support means and the roll of paper thereon, and for tilting said platens backwardly upon retractible movement of said platens with respect to said support means, means retaining a head to each platen to be applied to the end of a roll, and inclined guide tracks in association with said vacuum pick-ups and inclined at the angles of said platens when in their backwardly tilted positions for supplying heads to said platens upon the depositing of selected heads on said guide tracks.

15. In an apparatus for applying heads to rolls of paper and the like in the operation of wrapping the roll, a frame, a storage station for heads for the ends of the roll on each side of said frame, vacuum pick-ups for picking up selected heads, support means on said frame, between said storage stations, supporting a roll of paper on said frame for heading, header platens mounted on said frame at opposite ends of said support means, means moving said header platens on said frame towards and from the ends of said support means and the roll of paper thereon, and for tilting said platens backwardly upon retractible movement of said platens with respect to said support means, means retaining a head to each platen to be applied to the end of a roll, inclined guide tracks forming upward continuations of said platens when in their backwardly tilted positions, means moving said pick-ups to pick-up heads of a selected size and to release said heads to slide downwardly along said guide tracks onto said platens.

16. In an apparatus for crimping wrapping paper wrapped about a roll of paper and projecting beyond ends of the roll of paper to the ends of the roll of paper, a frame, support rolls for a roll of paper extending transversely of said frame and rotatably driven to rotate a roll of paper supported thereon, a carriage mounted on said frame at each side thereof, said carriages being movable transversely of said frame towards and from each other, each carriage having an arm transversely pivoted thereto having a crimping wheel mounted on the end thereof having crimping fingers thereon engageable with and crimping the projecting portion of the wrapper to a roll of paper on said support rolls, fluid operated motor means moving said arm and the crimping wheel supported thereon towards the roll of paper to effect a crimping operation, means driving said crimping wheel by rotational movement of the roll of paper comprising a second arm pivoted to said first arm and having a friction drive wheel thereon engageable with the roll of paper, a drive connection from said friction drive wheel to said crimping wheel, and a tension member drawing the free end of said second arm towards said first arm and yieldable to accommodate engagement of said friction wheel with said drum and to yieldably engage said wheel with said drum upon the bringing of said crimping wheel into position to crimp a wrapper to said drum.

17. In an apparatus for crimping wrapping paper wrapped about a roll of paper and projecting beyond ends of the roll of paper to the ends of the roll of paper, a frame, support rolls for a roll of paper extending transversely of said frame and rotatably driven to rotate a roll of paper supported thereon, a carriage mounted on said frame at each side thereof, said carriages being movable transversely of said frame towards and from each other, each carriage having an arm transversely pivoted thereto having a crimping wheel mounted on the end thereof having crimping fingers thereon engageable with and crimping the projecting portion of the wrapper to a roll of paper on said support rolls, fluid operated motor means moving said arm and the crimping wheel supported thereon towards the roll of paper to effect a crimping operation, means driving said crimping wheel by rotational movement of the roll of paper comprising a friction drive wheel engageable with the roll of paper and driven thereby, a second arm transversely pivoted to the free end of said first arm and having said friction drive wheel mounted on the free end thereof, a belt driving said crimping wheel from said friction drive wheel, a tension spring connected between said arms in spaced relation with the axis of pivotal connection of said arms and on the side thereof facing the roll of paper and biasing said arms to jack knife towards the roll of paper, and yieldably engaging said friction drive wheel with the roll of paper to be driven therefrom as said crimping wheel is brought into crimping position by said fluid motor means.

18. In a roll wrapping apparatus, means for supporting a roll, means for wrapping a wrapper annularly around the roll, and means for holding a head against the end of the roll so that the wrapper ends can be turned over the head including a pair of air nozzles, directing streams of air inwardly toward the end of the roll against the head and inwardly toward the axis of the roll at an angle thereto so that the air will tend to flow inwardly over the edges of the heads and the edges will not be lifted away from the roll ends.

19. A mechanism for delivering lengths of paper of different widths to a roll wrapping machine comprising in combination, means defining a ready position and an operational position, means supporting a plurality of rolls of paper of different widths with the lead ends of the webs of the rolls positioned at said ready position, selectively operable feeding means for each of the webs for moving the webs forwardly from said ready position to said operational position, a cutter at said operational position, a glue applicator located past said operational position, and wrapper pull back means pulling the web from each roll back from the operational position to the ready position after the web is cut by said cutter.

20. In an apparatus for wrapping rolls of paper,
a storage stand supporting a plurality of rolls of wrapping paper of different widths,
selectively operable feed means for feeding wrapping paper from selected of said rolls,
a shear shearing the wrapping paper to wrapper length,
wrapping paper pull back means pulling the sheared wrapping paper back and accommodating the advance sheared wrapper to be conveyed for wrapping to a roll of paper,
a conveyor conveying a roll of paper to be wrapped into position forwardly of said storage stand and shear and in alignment therewith,
means centering the roll of paper to be wrapped with respect to its wrapper,
a wrapping station in advance of said conveyor and including two longitudinally spaced power driven support rolls, rotatable about axes parallel to the axis of the roll of paper to be wrapped,
means advancing the roll of paper to said wrapping station and positioning the roll of paper on said rolls to be rotatably driven thereby,
conveyor means and guide means conveying the paper wrapper to said wrapping station to be wrapped on the rotating roll by passing between the rotating roll of paper to be wrapped and said parallel spaced power driven rolls,
a glue applicator in association with said guide means and disposed forwardly of said shear and on the incoming side of the nip between the roll of paper and said parallel spaced rotatably driven rolls and sequentially operable to apply strips of glue to the leading and trailing end portions of the wrapper on the face thereof facing the roll of paper to be wrapped, as the wrapper is advanced to the roll, and to thereby effect adhesion of the wrapper to the roll and wrapping of the wrapper thereabout by rotation of the roll drawing the wrapper between the roll and the parallel spaced power driven rolls.

21. In an apparatus for wrapping rolls of paper and the like,
a header station for applying heads to rolls of paper having wrappers wrapped thereabout and projecting beyond opposite ends thereof,
crimping means crimping the projecting ends of the paper wrapper over the ends of the roll of paper,
a storage stand for heads adapted to be applied to the ends of the roll of paper,
said header station including
header platens spaced from opposite ends of the roll to be wrapped and mounted for backward tilting movement with respect to the roll of paper about axes extending transversely of the axis of rotation of the roll,
means pivoting said platens into upright position into engagement with the ends of the roll,
suction means retaining the heads to said platens to be applied to the ends of the rolls of paper and including suction nozzles in said platens,
guide means guiding a head to be transferred from said storage station to an associated platen,
a pick-up device picking up a selected head from said storage station and releasing the head to be transferred to the associated platen along said guide means,
and a gluer associated with said guide means for gluing the heads prior to passing to said platens and accommodating the heads to be retained to the roll by the adhesive action of the glue thereon.

22. The apparatus of claim 21,
wherein the pick-up device is a vacuum pick-up device picking up a head by vacuum and releasing the head to said guide means,
and wherein the suction nozzles in said platens are also pressure nozzles and are directed to direct streams of air inwardly toward the head and toward the axis of the roll at an angle.

References Cited by the Examiner
UNITED STATES PATENTS

| | | | |
|---|---|---|---|
| 1,351,809 | 9/1920 | Sutherland | 53—214 X |
| 1,764,081 | 6/1930 | Jones et al. | 53—211 X |
| 2,368,213 | 1/1945 | Gerlach | 53—211 X |
| 2,681,534 | 6/1954 | Way | 53—214 X |
| 2,880,560 | 4/1959 | Gibson | 53—211 X |
| 2,893,191 | 7/1959 | Lancaster | 53—214 X |

TRAVIS S. McGEHEE, *Primary Examiner.*